United States Patent
Chen

(10) Patent No.: US 8,985,827 B2
(45) Date of Patent: Mar. 24, 2015

(54) BACKLIGHT MODULE HAVING OPTICAL FIBERS

(71) Applicant: Hon Hai Precision Industry Co., Ltd., New Taipei (TW)

(72) Inventor: Po-Chou Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/865,221

(22) Filed: Apr. 18, 2013

(65) Prior Publication Data
US 2014/0169023 A1  Jun. 19, 2014

(30) Foreign Application Priority Data
Dec. 19, 2012 (TW) .............................. 101148314 A

(51) Int. Cl.
*F21V 7/04* (2006.01)
*G02B 6/04* (2006.01)
*F21V 8/00* (2006.01)

(52) U.S. Cl.
CPC ............ *G02B 6/0008* (2013.01); *G02B 6/0006* (2013.01)
USPC .......................................... 362/554; 362/558

(58) Field of Classification Search
CPC ... G02B 6/0008; G02B 6/0006; G02B 6/0005
USPC .............. 362/97.1, 97.2, 97.3, 554, 551, 558, 362/556; 40/547
See application file for complete search history.

(56) References Cited

U.S. PATENT DOCUMENTS

| 4,807,092 A | * | 2/1989 | Hasegawa | 362/565 |
|---|---|---|---|---|
| 7,345,312 B2 | * | 3/2008 | Kazakevich | 257/81 |
| 2004/0114394 A1 | * | 6/2004 | Good et al. | 362/558 |
| 2009/0040781 A1 | * | 2/2009 | Ito | 362/554 |
| 2009/0081085 A1 | * | 3/2009 | Okamoto et al. | 422/131 |
| 2011/0227487 A1 | * | 9/2011 | Nichol et al. | 315/158 |

* cited by examiner

*Primary Examiner* — Anh Mai
*Assistant Examiner* — Glenn Zimmerman
(74) *Attorney, Agent, or Firm* — Novak Druce Connolly Bove + Quigg LLP

(57) ABSTRACT

A backlight module includes a light source, a reflector, an optical fiber group, and a light guide unit. The light source emits light rays. The reflector defines a number of through holes. The optical fiber group includes a number of optical fibers corresponding to the through holes. Each of the optical fibers includes a first end and a second end opposite to the first end. The first ends of the optical fibers receive the light rays from the light source. The second ends of the optical fibers are inserted into the corresponding through holes. The light guide unit is positioned close to the second ends, receives the light rays from the second ends, and makes the received light rays distribute uniformly. The reflector reflects a portion of the light rays reflected by the light guide unit to the light guide unit again.

7 Claims, 2 Drawing Sheets

BACKLIGHT MODULE HAVING OPTICAL FIBERS

BACKGROUND

1. Technical Field

The present disclosure relates to backlight modules, and particularly to a backlight module having optical fibers.

2. Description of Related Art

Currently, a light incident surface of a direct-type backlight module is greater than a luminance area of a single light source (such as a light emitting diode). Therefore, a portion of the light incident surface cannot receive light rays. To overcome this problem, a number of light sources are needed to be positioned on a same side of the light incident surface to make sure that the brightness distribution of the light emitting surface of the direct-type backlight module is uniform, which will need more electrical energy.

Therefore, it is desirable to provide a backlight module that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
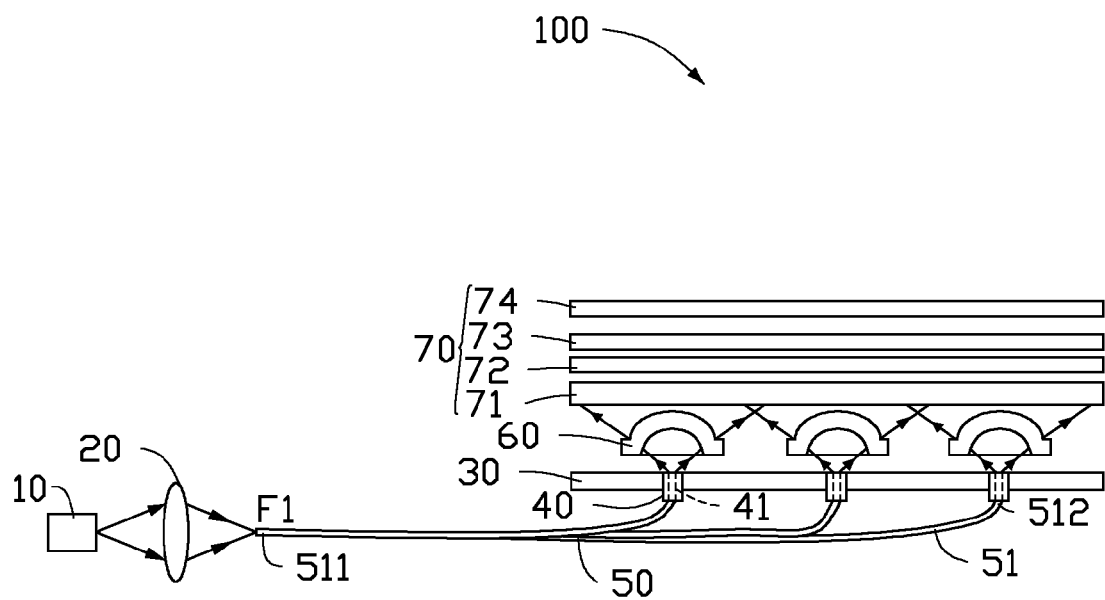
FIG. 1 is a schematic view of a backlight module, according to an exemplary embodiment, the backlight module including a reflector.

FIG. 1 illustrates a backlight module 100 in accordance with an embodiment. The backlight module 100 includes a light source 10, an optical coupling element 20, a reflector 30, a number of optical fiber adapters 40, an optical fiber group 50, a number of lenses 60, and a light guide unit 70.

The light source 10 emits light rays. In this embodiment, the light source 10 is a light emitting diode (LED).

The optical coupling element 20 is separated from the light source 10, and is used for converging the light rays. The optical coupling element 20 has a focus point F1. In the embodiment, the optical coupling element 20 is a converging lens.

Figure 2:
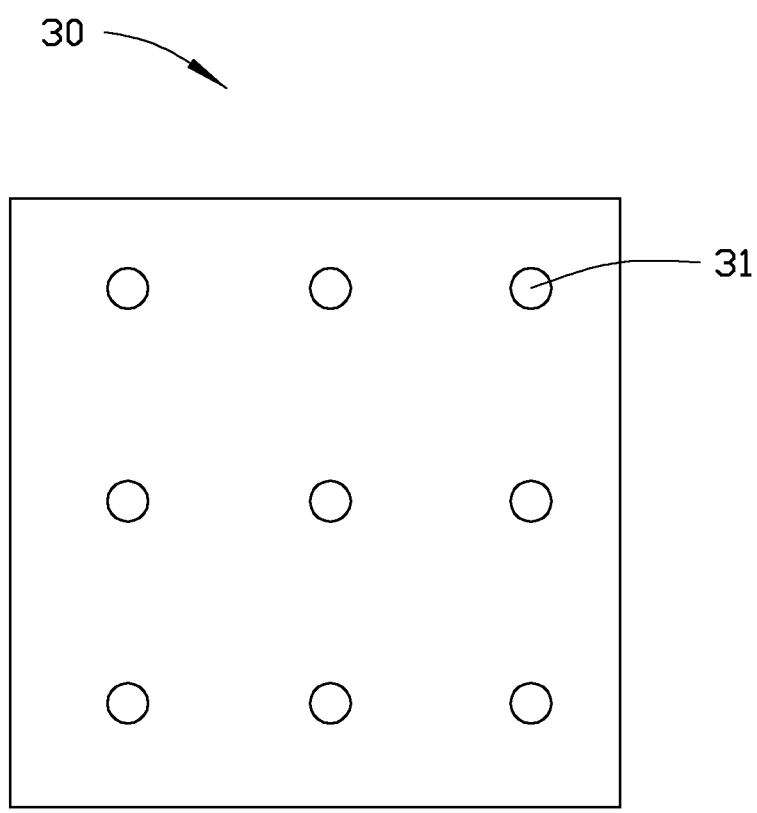
FIG. 2 is a schematic top view of the reflector of the backlight module of FIG. 1.

Referring also to FIG. 2, the reflector 30 defines a number of through holes 31 in an array of rows and columns.

The optical fiber adapters 40 are fixed in the through holes 31 respectively. Each of the optical fiber adapters 40 defines a fixing hole 41 passing therethrough.

The optical fiber group 50 includes a number of optical fibers 51. Each of the optical fibers 51 has a first end 511 and a second end 512 opposite to the first end 511. The first ends 511 are positioned on the focusing point F1, and are used for receiving the light rays from the optical coupling element 20. The second ends 512 are inserted into and are glued with the corresponding fixing holes 41, and thus the second ends 512 are fixed in the fixing holes 41.

The lenses 60 are corresponding to the optical fibers 51, and are positioned at a light emitting side of the second ends 512, and are used for diffusing the light rays from the second ends 512.

The light guide unit 70 has a first diffusion sheet 71, a first brightness enhancement sheet 72, a second brightness enhancement sheet 73, and a second diffusion sheet 74.

The first diffusion sheet 71 is positioned on a side of the lenses 60 away from the reflector 30, and is used for diffusing the light rays from the lenses 60 to make the light rays emitting from the first diffusion sheet 71 distribute uniformly. The reflector 30 is used for reflecting the light rays reflected by the first diffusion sheet 71 to the first diffusion sheet 71 again to increase the brightness of the first diffusion sheet 71.

The first brightness enhancement sheet 72 is positioned on a side of the first diffusion sheet 71 away from the reflector 30, the second brightness enhancement sheet 73 is positioned on a side of the first brightness enhancement sheet 72 away from the first diffusion sheet 71, and the second diffusion sheet 74 is positioned on a side of the second brightness enhancement sheet 73 away from the first brightness enhancement sheet 72. The first brightness enhancement sheet 72 and the second brightness enhancement sheet 73 are used for increasing the brightness of the light rays emitting from the first diffusion sheet 71. The second diffusion sheet 74 is used for diffusing the light rays from the second brightness enhancement sheet 73 to further improve the uniformity of the light rays emitting from the second brightness enhancement sheet 73.

The light transmitting path of the backlight module 100 is as follows: the light rays from the light source 10 is converged by the optical coupling element 20, and enter the first ends 511, and then are transmitted by the optical fibers 51 to the second ends 512. The light rays emitting from the second ends 512 enter the first diffusion sheet 71, the first brightness enhancement sheet 72, the second brightness enhancement sheet 73, and the second diffusion sheet 74 in order to emit to the exterior (such as a liquid crystal panel).

By employing the backlight module 100, a single light source becomes a number of small light sources through the optical fibers 51, and thus the electrical power is reduced.

In other embodiments, the optical fiber adapters 40 also can be omitted, and the through holes 31 are directly engaged with the second ends 512.

In other embodiments, the optical coupling element 20 also can be omitted, and the first ends 511 are directly positioned adjacent to the light source 10.

In other embodiments, the number of the light source 10 also can be more than one, and the number of the optical fiber group 50 also can be more than one, and the number of the optical fiber group 50 needs to be equal to the number of the light source 10.

In other embodiments, the optical fiber adapters 40 also can be made of elastic material, the diameter of the fixing hole 41 is slightly less than the diameter of the second end 512, and thus the optical fiber adapters 40 can hold the corresponding second ends 512 firmly.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A backlight module, comprising:
   a light source emitting light rays;
   a reflector defining a plurality of through holes;
   an optical fiber group comprising a plurality of optical fibers, each of the optical fibers comprising:
   a first end for receiving the light rays from the light source; and a second end opposite to the first end and inserted into a respective one of the through holes;

a plurality of lenses spatially corresponding to the through holes, wherein the lenses are configured for diffusing the light rays emitted from the second ends; and a light guide unit positioned adjacent to second ends of the optical fibers, and configured for receiving the light rays from the second ends and distributing the received light rays, wherein the reflector is configured for reflecting a portion of the light rays reflected by the light guide unit back to the light guide unit, and wherein the light guide unit comprises a first diffusion sheet, a first brightness enhancement sheet, a second brightness enhancement sheet, and a second diffusion sheet, the first diffusion sheet is positioned on a side of the lenses away from the reflector, the first brightness enhancement sheet is positioned on a side of the first diffusion sheet away from the lenses, the second brightness enhancement sheet is positioned on a side of the first brightness enhancement sheet away from the first diffusion sheet, and the second diffusion sheet is positioned on a side of the second brightness enhancement sheet away from the first brightness enhancement sheet.

2. The backlight module of claim 1, comprising an optical coupling element close to the light source, wherein the optical coupling element is configured for converging the light rays from the light source, the optical coupling element has a focus point, first ends of the optical fibers are positioned on the focus point of the optical coupling element.

3. The backlight module of claim 2, wherein the optical coupling element is a light converging lens.

4. The backlight module of claim 1, wherein the through holes are arranged in an array of rows and columns, and the lenses are also arranged in an array of rows and columns.

5. The backlight module of claim 1, comprising a plurality of optical fiber adapters, wherein each of the optical fiber adapters holds a respective one of the optical fibers and is received in a respective one of the through holes.

6. The backlight module of claim 5, wherein the optical fiber adapters are made of elastic material, each of the optical fiber adapters defines a fixing hole receiving the second end of the respective optical fiber, and a diameter of the fixing hole is slightly less than a diameter of the second end.

7. The backlight module of claim 1, wherein the light source is a light emitting diode.

* * * * *